March 3, 1964
W. J. FILLERY
3,122,937
GYROSCOPIC APPARATUS
Filed June 9, 1961
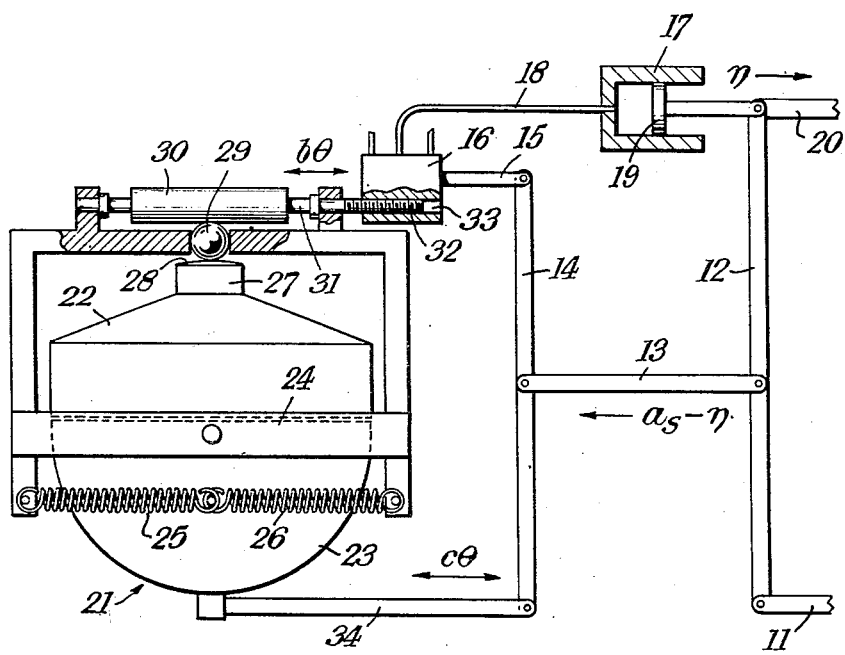
Inventor
William James Fillery
By Cushman, Darby & Cushman
Attorneys United States Patent Office 3,122,937
Patented Mar. 3, 1964

3,122,937
GYROSCOPIC APPARATUS
William J. Fillery, Holywood, County Down, Northern Ireland, assignor to Short Brothers & Harland Limited, Belfast, Northern Ireland, a British company
Filed June 9, 1961, Ser. No. 116,095
Claims priority, application Great Britain June 16, 1960
4 Claims. (Cl. 74—388)

It is well known that provision is often made in control systems for bodies such as gun platforms and V.T.O.L. aircraft for some means whereby command signals manually initiated or computor-calculated can be modified according to a predetermined mathematical equation before being applied to actuate the movement control apparatus for the body. For example, in the control of the attitude of a V.T.O.L. aircraft it is desirable to modify the command signal according to the following equation:

$$\eta = aS + b\theta + c\dot{\theta}$$

where $\eta$ is an actuator output, S is a command signal, $\theta$ is the angular attitude of the aircraft, $\dot{\theta}$ is the rate of change of attitude and $a$, $b$ and $c$ are constant co-efficients.

Hitherto, in order to modify the command signal according to the above equation to produce an actuator output it has been proposed to convert the command output, where necessary, to an electrical signal, to obtain from a free gyroscope an electrical signal representative of $\theta$ and to obtain from a rate gyroscope a further signal representative of $\dot{\theta}$. These signals are then added together in proportions consistent with the coefficients $a$, $b$ and $c$ and the composite signal is amplified and employed to control a servo motor providing a mechanical output representative of $\eta$.

It will be apparent that such apparatus although providing a solution of the above equation includes two gyroscopes and a relatively large number of electrical components. It is accordingly one object of the present invention to provide gyroscopic apparatus of simple construction which can be employed to provide measurements of the variables of the second and third terms of the above equation, thereby greatly reducing the complexity of the control system in which it is used.

According to the present invention, there is provided gyroscopic apparatus comprising a rotor adapted to move under precessional force through an angle proportional to the rate of turn of the apparatus about a predetermined axis, and means drivably engaged by the rotor so as to be driven thereby as the latter rotates about its rotary axis, the arrangement being such that the rotor-driven means is driven by the rotor at a speed which is in direct proportion or substantially in direct proportion to the precessional angular displacement of the rotor. The total movement of the rotor-driven means in such an arrangement is then proportional to the time integral of its speed and is therefore equal to the integral of the precessional angular displacement of the rotor. Since this angle is equal to the rate of turn of the apparatus about the predetermined axis, the total movement of the rotor-driven means is, clearly, a measure of the angle through which the apparatus has turned about the predetermined axis.

Preferably, the rotor-driven means comprises a caged ball located on the axis of rotation of the undisturbed rotor, in a position fixed in relation to the body of the apparatus. The ball is caged at this position so as to be in rolling contact with a spherical end face of the rotor. This end face is so curved as to maintain contact with the ball as the rotor moves angularly under precessional forces. A roller is rotatably mounted in a position fixed in relation to the body of the apparatus and so that it is in rolling contact with the ball. With such an arrangement precessional angular displacement of the rotor then causes the rotor end face to move relatively to the ball and effectively to bring the ball to a position on the end face displaced from the rotor axis. The ball thus makes rolling contact with the end face along a circular path thereof as the rotor revolves, the speed of rotation of the ball being a measure of the angular displacement of the rotor.

One embodiment of the invention will now be described by way of example with reference to the accompanying drawing which is a schematic diagram of gyroscopic apparatus according to the invention as applied to an attitude control system for a V.T.O.L. aircraft.

Referring to the drawing, the attitude control system shown is adapted to respond to a mechanical command input provided by a movable input shaft 11 controlled either manually or automatically. The mechanical input is applied via a set of control linkages 12, 13 and 14 to operate an input piston shaft 15 of a piston-and-cylinder pilot valve arrangement 16 of a hydraulic servo system, the output unit of which is in the form of a hydraulic actuator 17 supplied with hydraulic fluid from the valve 16 through a duct 18. The actuator 17 is provided with a piston 19 coupled to drive a drive shaft 20 of the attitude control apparatus of the aircraft.

Gyroscopic apparatus 21, according to this invention, is employed to control the effect of movement of the mechanical input shaft 11 on the hydraulic servo system. The gyroscopic apparatus 21 comprises a rate-of-turn gyroscope having a cylindrical rotor 22 rotatably mounted at one end in a stator 23 which is pivotally mounted in a gimbal frame 24 for pivotal movement about an axis at right angles to the rotor axis. The gimbal frame 24 is fixed in the body of the aircraft so that the axis about which the attitude of the aircraft is to be measured is at right angles to the pivotal axis of the stator 23 and the stator 23 is restrained by conventionally disposed rate springs 25 and 26 which hold the rotor axis at right angles to the attitude axis of the aircraft.

The end of the rotor 22, remote from the stator 23, is formed with a spigot 27 having a bearing end face 28 which lies on a spherical surface drawn by a radius vector from the point of intersection of the three axes of the gyroscope. Caged within the gimble frame 24 at a position on the axis of the undisturbed rotor 22 is a ball bearing 29 which maintains rolling contact with the spherical end face 28.

On the side of the ball 29 remote from the end face 28 there is provided a roller 30 rotatably mounted on the gimbal frame 24 and in rolling contact with the ball 29. A shaft 31 on which the roller 30 is mounted is extended and formed with a screw thread 32 which engages in threaded bore 33 in the casing of the cylinder of the hydraulic piston-and-cylinder valve 16.

With the rotor 22 revolving at constant speed but undisturbed by precessional forces, the ball 29 bears against the spigot end face 28, where the rotor axis intersects the end face, and as a result no motion is imparted to the ball 29. When, however, the aircraft turns about its attitude axis the rotor is angularly displaced about the stator axis through an angle proportional to the aircraft rate of turn. The rotor 22 in moving to this position continues to rotate at constant speed and rotates the ball 29 which now engages the end face 28 along a circular contact path centered about the rotor axis. A simple calculation shows that to a first approximation the speed with which the ball 29 is rotated is directly proportional to the angle through which the rotor 22 has been displaced.

The revolving ball 29 transmits its motion to the contacting roller 30 which in turn by means of its screw-threaded shaft 31 moves the hydraulic cylinder valve 16 at a speed proportional to the speed of the ball 29. As previously mentioned the angular displacement of the rotor 22 is proportional to the angular velocity of the aircraft.

On the other hand the total sliding movement of the casing of the cylinder 16 is directly proportional to the time integral of the speed of the ball 29 and hence of the angular displacement of the rotor 22. Clearly then the total movement of the casing is directly proportional to the angle of turn of the aircraft.

The piston of the hydraulic valve 16 hereinbefore referred to is connected by shaft 15 to one end of the lever 14 which acts as a floating differential lever. The other end of the lever 14 is connected by a pivotal lever 34 to the stator 23 so as to be moved in a sense at right angles to the lever 14 by an amount proportional to the angle through which the rotor 22, together with its supporting stator 23 are turned under precessional forces. Such movement is of course proportional to the angular velocity of the aircraft. The central fulcrum point of the differential lever 14 is adapted to be moved in a direction at right angles to the lever 14 in response to movements of an intermediate point of the further lever 12 which also serves as a floating differential lever, one end of lever 12 being coupled to the shaft 11 providing the mechanical input and the other end being coupled to the output member 20 employed to drive the movement control apparatus of the aircraft.

The gyroscopic apparatus hereinbefore described together with its associated differential levers and linkages serve to modify the mechanical input to the system in accordance with the equation hereinbefore specified. The movement of the cylinder of the hydraulic pilot valve 16 is, as described, proportional to the angle $\theta$ through which the aircraft is turned. Such movement provides a hydraulic output from the valve proportional to $\theta$ and representing the second term in the above equation. The movement of the piston of the valve 16 is controlled by the floating differential lever 14 and is effected by a compound motion of the lever. A part of this motion is derived from the coupling to the gyroscopic stator and is a measure of the angular velocity of the aircraft and represents the third term in the equation. The other part of this compound motion is derived from the floating differential lever 12 and is a measure of the command input representing the third term in the equation and a feed back representing the actuator output of the system.

Clearly with such an arrangement the command input is modified in accordance with the mathematical equation by a simple construction comprising a rate gyroscope and a set of interconnected levers.

Since the output of any integrator has an error which is the time integral of any error, however small, which is present at the input, some form of drift correction is often essential if the apparatus is to be used over a long period of time.

One well known technique uses the knowledge that the object of employing such drift correction is to ensure that the time integral of $\theta$ over a long period will be zero. Drift correction can therefore simply be obtained by arranging that the integral term tends to zero slowly, but at a rate which is at least as fast as the input drift rate. This can be achieved in the apparatus described by biasing the end points of the rate spring very slightly by an amount proportional to the $\theta$ term.

When the time integral $\theta$ over a long period is to be other than zero, or in cases when more accurate knowledge of $\theta$ is demanded, it is necessary to use long term pendulous monitoring such as is used in normal free gyro techniques. This consists of measuring the difference between the $\theta$ as measured by the integral of $\dot\theta$ and $\theta$ as measured by a pendulum and biasing the rate springs accordingly.

It will be appreciated that gyroscopic apparatus according to this invention may be employed simply to provide a direct measurement of angular attitude $\theta$ or to provide simultaneous measurements of angular attitude $\theta$ and rate of change of attitude $\dot\theta$. Outputs from the apparatus which are representative of these variables may be utilised as desired.

What I claim as my invention and desire to secure by Letters Patent is:

1. Gyroscopic apparatus comprising a rotor adapted to move under precessional force through an angle proportional to the rate of turn of the apparatus about a predetermined axis, a caged ball located on the axis of rotation of the undisturbed rotor in a position fixed in relation to the body of the apparatus, the ball being caged at this position so as to be in rolling contact with a spherical end face of the rotor and said end face being of such a curvature as to maintain contact with the ball as the rotor moves angularly under precessional force, and a roller rotatably mounted in rolling contact with the ball.

2. A hydraulic servo system including gyroscopic apparatus according to claim 1, said servo system comprising input control means and a hydraulic actuator responsive to hydraulic fluid fed thereto through a hydraulic control valve having two cooperating relatively movable members, one of which moves in response to movement of the said input control means of the system and the other of which is arranged to be moved by the roller of the said gyroscopic apparatus.

3. A system according to claim 2, wherein said one member of the hydraulic control valve is adapted to be moved by said input control means through an arrangement of pivotally interconnected levers comprising a first differential lever which applies a compound motion to the said one member of the control valve arrangement, said compound motion being constituted by a component proportional to the amount by which the roller is turned and a component derived from the output point of a further differential lever providing a compound motion at said output point constituted by a component representative of the motion of the input control means and a component in the opposite sense representative of the movement of an output member of the hydraulic actuator of the servo control system.

4. A system according to claim 2, wherein the roller is connected to drive a screw drivingly engaging the said other of the movable members to cause a linear displacement of the latter proportional to the rotation of the roller.

References Cited in the file of this patent
UNITED STATES PATENTS

| | | |
|---|---|---|
| 2,049,375 | Henderson | July 28, 1936 |
| 2,442,389 | Weiss | June 1, 1948 |
| 2,709,922 | Knutson | June 7, 1955 |
| 2,754,789 | Minisini | July 17, 1956 |